United States Patent
Byrne et al.

(10) Patent No.: US 6,487,672 B1
(45) Date of Patent: Nov. 26, 2002

(54) DIGITAL TIMING RECOVERY USING BAUD RATE SAMPLING

(75) Inventors: Jason Byrne, Longmont, CO (US); Thomas Conway, County Offaly (IE)

(73) Assignee: STMicroelectronics, N.V. (NL)

(*) Notice: Subject to any disclaimer, the term of this patent is extended or adjusted under 35 U.S.C. 154(b) by 0 days.

(21) Appl. No.: 09/387,146

(22) Filed: Aug. 31, 1999

Related U.S. Application Data

(60) Provisional application No. 60/113,837, filed on Dec. 24, 1998.

(51) Int. Cl.[7] .................................................. G06F 1/04
(52) U.S. Cl. ........................ 713/400; 713/600; 360/51
(58) Field of Search ................................ 713/400, 401, 713/503, 600; 360/51

(56) References Cited

U.S. PATENT DOCUMENTS

| | | | |
|---|---|---|---|
| 4,726,067 A | 2/1988 | Alonso | 381/106 |
| 4,847,701 A | 7/1989 | Suesada | 358/335 |
| 4,866,647 A | 9/1989 | Farrow | 364/724.1 |
| 5,696,639 A | 12/1997 | Spurbeck et al. | 360/5.1 |
| 5,726,818 A | 3/1998 | Reed et al. | 360/51 |
| 5,760,984 A | 6/1998 | Spurbeck et al. | 360/51 |
| 5,796,535 A | 8/1998 | Tuttle et al. | 360/51 |
| 5,812,336 A | 9/1998 | Spurbeck et al. | 360/51 |
| 5,835,295 A * | 11/1998 | Behrens | 360/51 |
| 5,892,632 A | 4/1999 | Behrens et al. | 360/51 |
| 6,009,549 A * | 12/1999 | Bliss et al. | 714/769 |
| 6,028,728 A * | 2/2000 | Reed | 360/51 |
| 6,226,758 B1 * | 5/2001 | Gaalaas et al. | 713/600 |

OTHER PUBLICATIONS

Signals and Systems; Alan V. Oppenheim, Alan S. Willsky with Ian T. Young; Prentice–Hall Signal Processing Series; 1983; pp. 515–519.

Floyd M. Gardner, Interpolation in Digital Modems—Part I: Fundamentals, *IEEE Transactions on Communications*, 41(3), Mar. 1993.

Floyd M. Gardner, Interpolation in Digital Modens—Part II: Implementation and Performance, *IEEE Transactions on Communications*, 41(6), Jun. 1993.

* cited by examiner

*Primary Examiner*—Dennis M. Butler
(74) *Attorney, Agent, or Firm*—Lisa K. Jorgenson; Steven H. Slater

(57) ABSTRACT

A baud rate digital timing recovery circuit for use in the read channel of a storage device controller is able to operate nominally at the baud rate by recognizing and compensating for oversampling and undersampling conditions. The read channel includes a sample rate converter for interpolating between digitally sampled values and a digital timing recovery loop that detects a phase error in the interpolated signal and adjusts the interpolation interval accordingly. An accumulator circuit generates a modulo-TS interpolation interval value, where TS is the sampling period. Detection circuitry detects when the interpolation interval value has wrapped through its maximum value or minimum value and generates an oversampling or undersampling signal in response. The oversampling and underampling signals are received by an elastic buffer. The elastic buffer operates to store extra values that are generated during undersampling conditions and also disregards bogus samples that are generated during oversampling conditions, in response to the undersampling and oversampling signals. A mini-elastic buffer, also responsive to the oversampling and undersampling signals may be employed in the phase detection loop. The system can operate at the nominal baud rate or can operate at a half baud rate with two parallel paths for processing two incoming samples with each clock cycle.

20 Claims, 4 Drawing Sheets

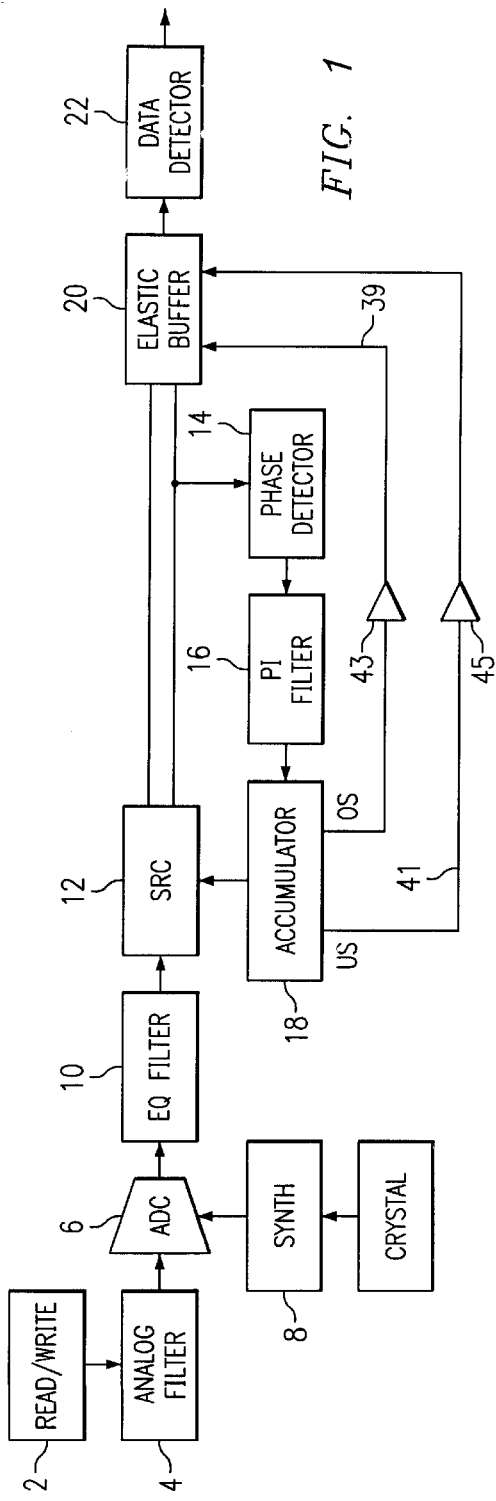
FIG. 1
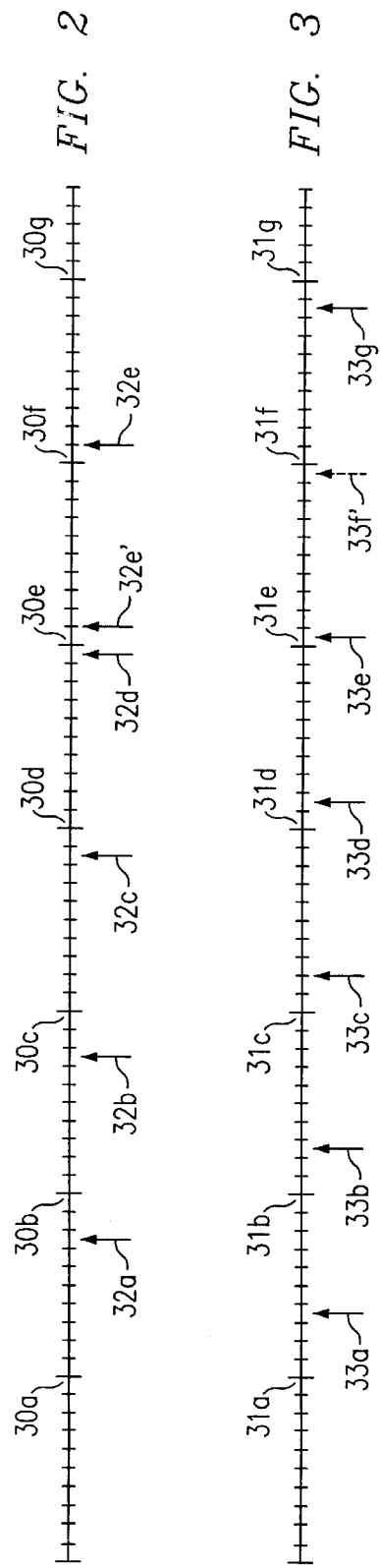
FIG. 2
FIG. 3

DIGITAL TIMING RECOVERY USING BAUD RATE SAMPLING

This application claims benefit of U.S. Provisional Application Serial No. 60/113,837 filed Dec. 24, 1998, which application is incorporated herein by reference.

FIELD OF THE INVENTION

The present invention relates generally to reading of information from a storage medium and more particularly to a storage medium read channel employing interpolated timing recovery.

BACKGROUND OF THE INVENTION

The need to increase the storage density of information storage media, such as magnetic and optical storage media, is a well-known goal in the art. In a typical magnetic storage media device, information is written onto the medium as a series of pulses, which pulses are recorded as magnetic bit cells of either a positive or negative polarity. The pulses are then read using a coil, such as a read/write head, whereby the transitions in the polarity between adjacent bit cells cause an analog signal in the coil as the read/write head passes over the magnetic medium. The analog signal can then be coded into a digital signal using well-known digital sampling techniques.

As the analog signal is converted to a digital signal, it is important to properly align the sampling rate and phase to the rate and phase at which the information was originally written. This is important so as to ensure accurate detection of the pulses that were written to the medium. The rate at which the signal was written to the storage medium is typically referred to as the baud rate.

Accurate sampling at the baud rate and with minimal phase shift is necessary in order to minimize inter-symbol interference, as well. As storage density has increased, with the bit cells being placed closer together, the need to accommodate inter-symbol interference has become increasingly important.

Sample rate and phase variations can be compensated for in two general ways. In the first method, the phase difference between the sampled values and expected values is detected, and the sampling clock, typically a variable frequency oscillator (VFO) is adjusted in order to minimize or eliminate the phase difference, using a frequency feedback loop. Several VFOs may be required, however, one for the write channel, and one or more may be required for the read channel if information is written to the storage medium at different nominal baud rates, which is often the case. These multiple VFOs may give rise to cross-talk interference. More importantly, the VFO requires analog circuitry for its implementation. Analog circuitry is much more susceptible to process variations affecting circuit performance. Likewise, analog circuitry is not as easily migrated to new semiconductor processes which is an additional disadvantage. Circuit test is also more difficult with analog circuits than with comparable digital circuits.

A digital circuit based method of compensating for frequency and phase errors employs digital interpolation to minimize phase errors. In the digital interpolation method, the analog signal is sample asynchronously to the baud rate. The phase difference between the sampled values and expected values is again detected, but this phase error signal is used to adjust the interpolation interval of an interpolating timing recovery circuit. The interpolating timing recovery circuit generates interpolated sample values that are substantially synchronous to the baud rate. Because the interpolating timing recovery circuit does not require adjusting the sampling rate, the need for multiple VFOs is eliminated.

Because the interpolating timing recovery circuit samples asynchronously, however, an oversampling condition or undersampling condition is likely to result. In an oversampling condition, the sampling frequency exceeds the baud rate. As a result, the period between successive sample points must be extended in order to synchronize to the baud rate. In the undersampling condition, the sampling frequency is less than the baud rate, and the interpolator circuitry must decrease the period between successive sample points. Because the sampling is done asynchronously, the circuitry has no way of knowing whether it is in an oversampled or undersampled condition, however.

In order to address this issue, prior art methods have been employed in which the sampling rate is selected at a frequency that is known to be higher than the baud rate. For instance, Spurbeck et al., in U.S. Pat. No. 5,696,639, disclose an interpolating timing recovery circuit in which the sampling rate is selected to always be 1% to 2% higher than the write clock or baud rate. In that way, the read channel is known to always be operating in an oversampling condition. Once this is known, techniques can be employed to compensate for the oversampling condition, as is disclosed in the referenced patent.

The drawback in forcing an oversampling condition at all times is that this requires two separate synthesizers, one for the baud rate clock and one for the read channel clock. These two clocks must be close in frequency, say within 2%, at each of the frequencies at which data may be written to the storage medium (e.g. different baud rates may be employed at different locations on the storage medium). Because the synthesizers are analog circuits, the circuits are sensitive to process and other variations that might skew the frequencies of the clocks relative each other.

Therefore a need exists in the art for an efficient interpolating timing recovery circuit that can accommodate an asynchronous sampling clock that is nominally at the baud rate and that can compensate for both oversampling and undersampling conditions that may arise from differences in the baud rate and the sampling rate.

SUMMARY OF THE INVENTION

The present invention provides a device for reading information stored on a medium by detecting data from a sequence of discrete time interpolated sample values. The interpolated sample values are generated by interpolating a sequence of discrete time channel sample values generated by sampling pulses in a read signal from the medium. The device includes a sampling clock outputting a clock signal with a period of T and a sampling device, responsive to the sampling clock, receiving as input the read signal and outputting the channel sample values. An interpolated timing recovery circuit receives as input the channel sample values and outputs the interpolated sample values. The interpolated timing recovery circuit includes an accumulator for generating, modulo-T, a fractional delay value. An elastic buffer receives as input and stores the interpolated sample values from the interpolated timing recovery circuit. The interpolated sample values are subsequently read out to a data detector. In response to detection that the fractional delay value has wrapped past its maximum value through its minimum value, the elastic buffer prevents one interpolated sample value from being read out to the data detector; and in response to detection that the fractional delay value has wrapped past its minimum value through its maximum value, the elastic buffer stores one interpolated sample value and one associated channel sample value.

BRIEF DESCRIPTION OF THE DRAWINGS

FIG. 1 is a block diagram of a magnetic storage medium read channel incorporating a first preferred embodiment of the invention.

FIG. 2 is a timing diagram illustrating an oversampling condition.

FIG. 3 is a timing diagram illustrating an undersampling condition.

DESCRIPTION OF THE PREFERRED EMBODIMENTS

Figure 4:
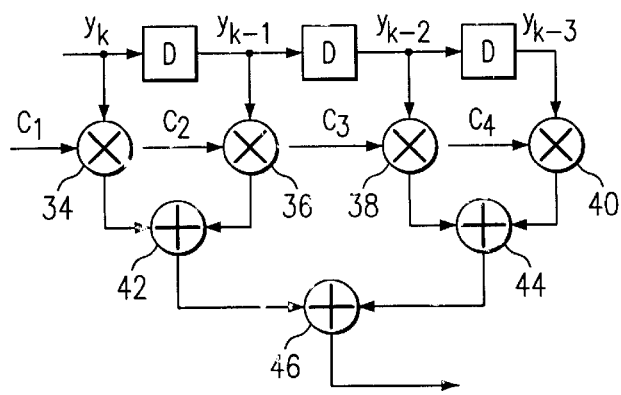
FIG. 4 is a block diagram of a preferred sample rate converter.

The making and use of the presently preferred embodiments are discussed below in detail. However, it should be appreciated that the present invention provides many applicable inventive concepts that can be embodied in a wide variety of specific contexts. The specific embodiments discussed are merely illustrative of specific ways to make and use the invention, and do not limit the scope of the invention.

FIG. 1 illustrates a first preferred embodiment read channel. Information is stored on a storage medium, such as a magnetic disk (not shown) as a series of bit cells of varying magnetic polarity. A read/write coil 2 passes over the magnetic medium and converts the magnetic pulses into an analog electrical signal, as is well known in the art. This analog channel signal is filtered by analog filters 4 before being passed to analog to digital converter (ADC) 6.

ADC 6 samples the incoming signal at a sampling rate provided by sampling clock 8 and outputs a digital signal consisting of a sequence of channel samples. As illustrated, sampling clock 8 is preferably a crystal-driven synthesizer.

In an ideal world, sampling clock 8 would be perfectly matched in phase and frequency to baud rate at which the signal was written to the storage medium. In actual practice, however, variations occur. Even if the baud rate and the sampling rate are exactly matched, frequency and phase deviations can arise from the fact that the magnetic medium is typically a disk being spun by a spindle motor. Many parameters can affect the speed at which the spindle motor spins, including environmental factors such as vibration and temperature, mechanical aging of the motor, and the like.

When the sampling clock rate exceeds the baud rate, this condition is known as oversampling. FIG. 2 illustrates an oversampling situation. The heavy hash marks 30a, 30b, 30c illustrate the channel samples, that is the points on the time line that ADC 6 sampled the incoming analog signal. Note that the channel samples have an associated period, $T_S$. Arrows 32a, 32b, 32c illustrate the desired sampling points, which would arise if there were no frequency offset and no phase offset between sampling clock 8 and the baud rate. Desired sampling points have associated with them a period $T_B$. Note that because the sampling clock has a higher frequency than the baud rate, the channel samples have a shorter period between them than the desired sampling points, and hence the desired sampling points appear to be moving to the right relative to the corresponding channel samples. This illustrates the oversampling condition.

By contrast, FIG. 3 illustrates an undersampling condition, which arises when the sampling clock is slower than the baud rate. Because the channel samples have a longer period than the desired samples, the desired samples appear to be moving toward the left relative to the corresponding channel samples.

As will be described in more detail below, the preferred embodiments of the present invention allow for interpolated timing recovery so as to re-align the channel samples to the desired sample points in either an oversampling or an undersampling condition and allows for the read channel to read from the storage medium at nominally the baud rate.

Referring again to FIG. 1, the digital signal from ADC 6 passes through equalization filter 10. As will be apparent to those skilled in the art, equalization filter 10 is preferably a Nyquist finite impulse response filter. The exact configuration of equalization filter 10 depends upon the partial response coding method employed. In the preferred embodiments, the information signal is encoded using the EPR4 standard and hence equalization filter 10 will shape the incoming digital signal and attempt to drive each channel sample to the appropriate one of the five levels employed in the EPR4 standard.

The signal is then passed to sample rate converter 12 where the desired sample points 32a, 32b, 32c . . . are derived by interpolating between channel samples 30a, 30b, 30c . . . The interpolation interval is determined from a fractional delay value derived in accumulator 18, as will be described below. Sample rate converter 12 is preferably a finite impulse response filter as may be implemented as illustrated in FIG. 4.

Incoming channel samples denoted as $y_k$, $y_{k-1}$, $y_{k-2}$, $y_{k-3}$, in FIG. 4 pass through sample rate converter 12 and are operated upon by coefficients $C_1$, $C_2$, $C_3$, $C_4$, respectively, in multipliers 34, 36, 38, and 40, respectively. The products are added together in adders 42, 44, and 46 and the interpolated value is output.

For practical considerations, the interpolation interval, i.e. the interval over which sample rate converter 12 can interpolate is limited to one sampling rate time period. With reference to FIG. 2, this means that for any given channel samples, such as 30a and 30b, for example, sample rate converter 12 can interpolate a desired sample point anywhere between the channel samples, 30a and 30b, but cannot interpolate a desired sample point outside that range. This limitation has important implications that will be addressed below. Although a sample rate converter capable of sampling over a greater range than one time period can be designed, such a design would be prohibitively complex for practical use in the intended systems.

From sample rate converter 12 the interpolated samples are output to elastic buffer 20 where they are stored for subsequent access by data detector 22. Data detector 22 is preferable a Viterbi decoder. The operation of elastic buffer will be addressed in greater detail below.

As described above, sample rate converter interpolates between channel samples to obtain the desired sample point. The location of the desired sample point, and hence the interpolation interval, relative to the channel samples depends upon the phase difference between the channel samples and the desired sampling points. The following discussion describes a preferred embodiment timing recovery loop for detecting the phase difference and generating therefrom a fractional delay value which is employed by the sample rate converter to set the interpolation interval.

As shown in FIG. 1, the output of sample rate converter 12 goes not only to elastic buffer 20, but is also provided to the input of phase detector 14. Phase detector 14 operates to detect the phase difference between the sampled signal and an expected signal. The expected signal is a best estimate of what the sampled signal would look like if it had been sampled at the baud rate without any phase error. Preferably, phase detector 14 contains a slicer circuit as is well known in the art. Each incoming sample passes through the slicer circuit where a value corresponding to the nearest EPR4 level is assigned to the sample. This EPR4 level value is the estimate of what the sample value would be in a case of no phase error. The output of the slicer is then compared to the actual sample value and a difference value is determined. A difference value signal is generated as successive samples are input to the phase detector. As is known in the art, a phase error can be calculated from the slope of the difference value signal. In the preferred embodiments, a four bit phase error value provides sufficient resolution for efficient phase tracking and correction. This phase error signal is output from phase detector 14 and fed to PI filter 16.

PI filter 16 includes both a proportional filter and an integral filter. The proportional path simply provides a loop gain to the incoming error signal. The integral path integrates or averages the incoming error signal and applies a loop gain as well. The signals from both the proportional path and the integral path are added together and are output from PI filter 16. In this way, the timing recovery loop can compensate for a constant phase error, as would arise in the situation where the sampling clock matches the baud rate, but is slightly phase shifted, and can also compensate for a changing phase error, as would arise in an oversampling or undersampling condition as described above and illustrated in FIGS. 2 and 3.

Figure 5:
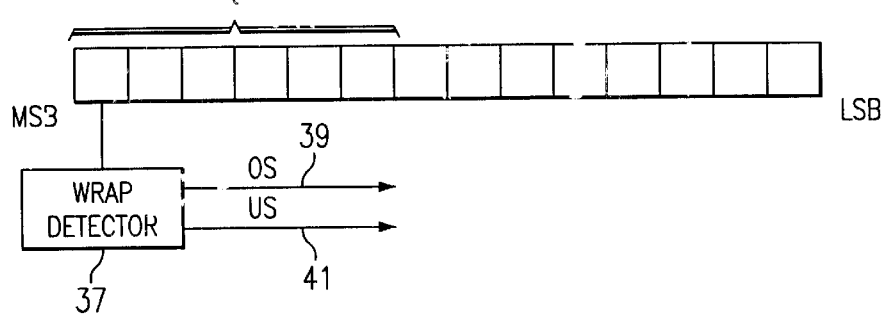
FIG. 5 is a diagram of a fourteen bit register used in a first preferred accumulator circuit.

Accumulator 18 receives as input the ten bit filtered phase error signal from PI filter 16 and outputs a fractional delay value, $\tau$, as will be described herein. In the first preferred embodiment, accumulator 18 includes fourteen bit register 36 as illustrated in FIG. 5, accumulates values of the filtered phase error signal 175 received from PI filter 16. In other words, the ten bit phase error signal is fed to the ten LSB of the accumulator register and is counted up (added). The six most significant bits (MSB) of the accumulator register 36 comprise the fraction delay value $\tau$.

In operation, accumulator register 36 operates as a wrap-around counter. As each new phase error value is received, it is simply added to the previous value stored in the LSB. Note that the phase error value can be either a positive or a negative value, depending on whether the sample values are preceding or following the desired sample points.

As the value in the LSBs increase the MSBs are incremented as well. As stated above, the six MSBs comprise the fractional delay value, or $\tau$, that is fed to the sample rate converter to no derive the interpolation value. Therefore, the interpolation interval will increase over time as accumulator 18 adds up the incoming phase error signals. This steadily increasing interpolation value will compensate for an oversampling condition, as illustrated in FIG. 2. Likewise, if the phase error signal has a negative value, the value in accumulator register will decrement and $\tau$ will decrease over time. This will compensate for an undersampling condition as illustrated in FIG. 3.

Recall that sample rate converter, which selects the interpolation interval in response to $\tau$, is constrained by design limitations to an interpolation interval of one sampling period. Therefore, $\tau$ must be constrained. This is accomplished by the wrap around feature of accumulator register 36, which is designed to count upwards modulo $T_S$, where $T_S$ is the sampling period. Because $\tau$ is driven by accumulator register, it also increments or decrements modulo $T_S$.

Because accumulator register 36 counts upwards or downwards modulo $T_S$, it (and hence $\tau$) will wrap from its maximum value to its minimum value and vice versa. In the preferred embodiments, $\tau$ is derived from the six MSB of accumulator register 36. As such it can have a value from 0 to 63. When the six MSB of accumulator register 36 are at 63 (i.e. all 1's) and the six MSB are next incremented, accumulator register 36 wraps around back through 0 and continues incrementing up from 0. As a result, $\tau$ also wraps from 63 back through 0. Likewise, when the six MSB are at 0 (all 0's) and the accumulator register is decremented by a negative value phase error signal, the six MSB will wrap back around through maximum value of 63 and continues decrementing from 63. As a result, $\tau$ also wraps from 0 back through 63.

With reference to FIG. 2, the above discussion illustrates how the modulo $T_S$ accumulator register constrains the value of $\tau$ so as not to select an interpolation interval that is beyond the capacity of sample rate converter 12.

Addressing the oversampling condition for further detail, with reference to FIG. 2, note that the interpolation interval is increasing over time. In the example illustrated, sample rate converter can interpolate between any two channel samples to one of ten discrete interpolation intervals between those samples, as indicated by the light hash marks. Sample rate converter 12 must store or have access to ten different sets of coefficients, $C_1$, $C_2$, $C_3$, $C_4$, one set for each discrete interpolation interval. Stated another way, sample rate converter 12 has a resolution of ten interpolation intervals. In preferred embodiments sample rate converter has a resolution of 64 possible interpolation intervals (requiring storage of or access to 64 sets of coefficients $C_1$, $C_2$, $C_3$, $C_4$). For clarity of the illustration, however, only ten intervals are shown.

Note that in the oversampling condition the actual sampling period is shorter than the desired sampling period and hence each successive interpolation period is longer (relative to the immediately preceding sample point). If the oversampling condition persists long enough, the interpolation interval necessary to derive the desired sample point will eventually extend beyond one sample period. Desired sample points 32d and 32e illustrate this. Note that desired sample point 32d, corresponding to actual sample point 30d requires interpolation very near the maximum interpolation interval, i.e. one sample period. Because the actual sampling period is shorter than the desired sampling period, the next desired sample point, 32e, is actually beyond one sample period from the corresponding channel sample 30e.

As discussed above, sample rate converter 12 is constrained, for practical design purposes, to only be able to interpolate over one sampling period, and hence accumulator 18 generates a modulo $T_S$ fractional delay value $\tau$.

Hence, after being at its maximum value when interpolating to desired sample point 32d, τ next wraps back through its minimum point when calculating the next desired sample point, resulting in a bogus, undesired sample point 32e'. FIG. 2 illustrates the desired sample point 32e, which is greater than one sample period from its corresponding sample point 32, and also illustrates the bogus interpolated point 32e' that results from the wrap-around characteristic of τ. Note that on the next cycle, τ will still be at or very near the same value (τ increments and decrements relatively slowly because τ is derived from the six MSB of accumulator register 36 whereas accumulator register 36 is incremented by the phase error signal from PI filter 16 feeding into its six LSB), and hence desired sample point 32e will be interpolated correctly then. The problem is, however, that interpolated sample 32e' is a bogus sample that must be discarded or disregarded so as not to introduce an error into the signal.

Figure 6:
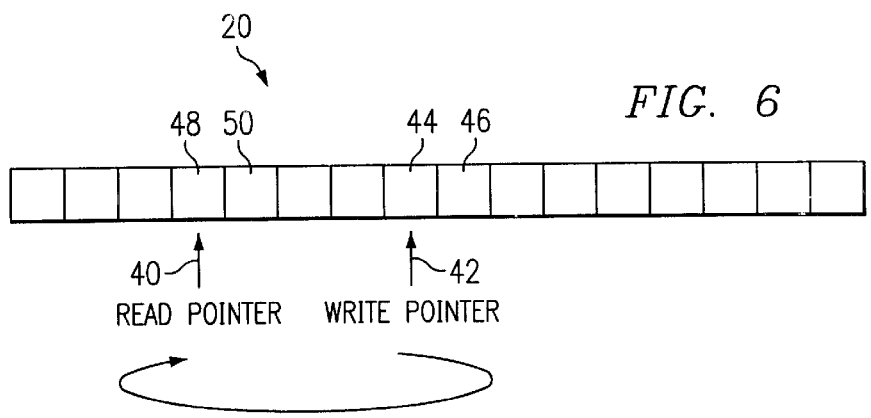
FIG. 6 is a block diagram of a first preferred embodiment elastic buffer.

The timing recovery loop of the preferred embodiments compensate for bogus interpolated sample 32e' by recognizing when accumulator register 36 has wrapped from its maximum value through its minimum value and by instructing elastic buffer 20 that the incoming interpolated value is bogus. FIG. 6 illustrates a first preferred embodiment elastic buffer, which comprises a sixteen sample wide first in first out (FIFO), buffer 38, a read pointer 40 and a write pointer 42.

In operation, elastic buffer 20 receives one interpolated sample from sample rate converter 12 on each clock cycle. An incoming interpolated sample is stored in memory cell 44 of FIFO 38 as identified by write pointer 42. After the interpolated sample has been written to memory cell 44, write pointer 42 is incremented to now point to memory cell 46. On the next clock cycle, the next interpolated value will be written to memory cell 46. Likewise, on each clock cycle, one stored interpolated value is read from a memory cell and passed to data detector 22. As illustrated, write pointer 40 is pointing to memory cell 48, so on the first clock cycle, the interpolated sample stored in memory cell 48 will be passed to data detector 22 and read pointer 40 will increment to memory cell 50. On the next cycle, the interpolated value stored in memory cell 50 will be passed to data detector 22, and so on. Preferably each memory cell 44 is a six bit memory device to accommodate the six bit interpolated sample and preferably elastic buffer 20 comprises sixteen such memory cells. Preferably, the read and write pointers are "software" pointers, such as stack pointers as are well known in the art. Each pointer has associated with it a register, which register stores the address of the memory cell to which it is pointed. This address may or may not be updated on a given clock cycle to point to the next memory cell, as discussed below. As discussed above, during oversampling, whenever accumulator register 36 wraps past its maximum value, τ also wraps past it maximum value and hence sample rate converter 12 produces a bogus interpolated value. This bogus interpolated value will be passed to elastic buffer 20. Care must be taken that this bogus interpolated value is not passed on to data detector 22 and introduce an error into the signal. This is accomplished by sending oversampling signal (OS) 39 from accumulator 18 to elastic buffer 20 whenever accumulator register 36 wraps past its maximum value.

Referring again to FIG. 5, wrap detector 37 detects whenever accumulator register 36 wraps past it maximum value. When this happens, wrap detector 37 sends an oversample signal 39 to elastic buffer 20. Note that the signal is delayed by delay buffer 43. This is because of the latency inherent in sample rate decoder 12. Depending on the latency, one, two or more clock cycles might elapse between the time accumulator register 36 wraps, resulting in a bogus interpolated value, and the time the bogus interpolated value is received at elastic buffer 20. Delay buffer 43 delays oversample signal 39 from reaching elastic buffer 20 until the bogus interpolated sample is written to elastic buffer 20.

Receipt of oversample signal 39 causes write pointer 42 not to be incremented for one clock cycle after the bogus sample is written to a memory cell in FIFO 44. Because the write pointer is not incremented, the bogus interpolated sample will be overwritten on the next clock cycle when the next interpolated value is written to the same memory cell. In this way, the bogus value is not passed to data detector 22.

The undersampling condition is next described with reference to FIG. 3. In the undersampling condition, the sampling clock is slower than the baud rate and hence the desired sampling points 33a, 33b, 33c . . . appear to be moving to the left relative the channel samples 31a, 31b, 31c . . . As in the case of oversampling, the sample rate converter interpolates between sample points 31a, 31b, 31c . . . to the desired sample points 33a, 33b, 33c . . . based upon the interpolation interval τ derived from the most significant bits of accumulator register 36. In the case illustrated in FIG. 3, the phase error signal generated in phase detector 14 will have a negative value because the phase shift between the sample points and the desired sample points is decreasing over time. Eventually, however, the phase error signal decrementing accumulator register 36 past its minimum value, 0, and the register will wrap from its minimum value through its maximum value.

Taking the point 33e as an example, note that the interpolation interval is very near the minimum value, i.e. the desired sample point 33e is very near the actual sample point 31e. The next desired sample indicated by the dashed arrow 33f, actually comes before the next actual sample point 31f. Because sample rate converter is only capable of interpolating one interpolated point for each clock cycle, it cannot interpolate both points 33e and 33f. On the next clock cycle, the sample rate converter cannot interpolate to the point 33f because this point would then be outside the one sample period range over which the sample rate converter can interpolate. In other words, in the first clock cycle, sample rate converter can interpolate to any point between samples 31e and 31f, and during this clock cycle, the sample rate converter operates to derive interpolated point 33e. On the next clock cycle, new sample points are loaded into sample rate converter 12 and it can interpolate to any point between channel samples 33f and 33g; it cannot, however, interpolate to point 33f because this point is outside the one sample period range.

Note, however, that interpolated point 33f' is very near in time (and hence in signal value) to sample point 31f. The preferred embodiment timing recovery system takes advantage of this fact that the interpolation interval changes very slowly over time, and simply substitutes the channel sample 31f for the missing interpolated sample 33f'. Note also that two valid samples (interpolated sample 33e and channel sample 31f) will be passed to elastic buffer 20 in a single cycle. Elastic buffer 20 must accommodate both of these valid samples in a single cycle.

Referring back to FIG. 5, wrap detector 37 responds to the undersampling condition in much the same way as the oversampling condition by recognizing when accumulator register 36 has wrapped from its minimum value through to its maximum value. When this condition occurs, wrap detector 37 sends an undersample signal (US) 41 to elastic buffer 20. As before, undersample signal 41 is delayed in delay buffer 45 in order to compensate for the sample rate converter's latency.

Figure 7:
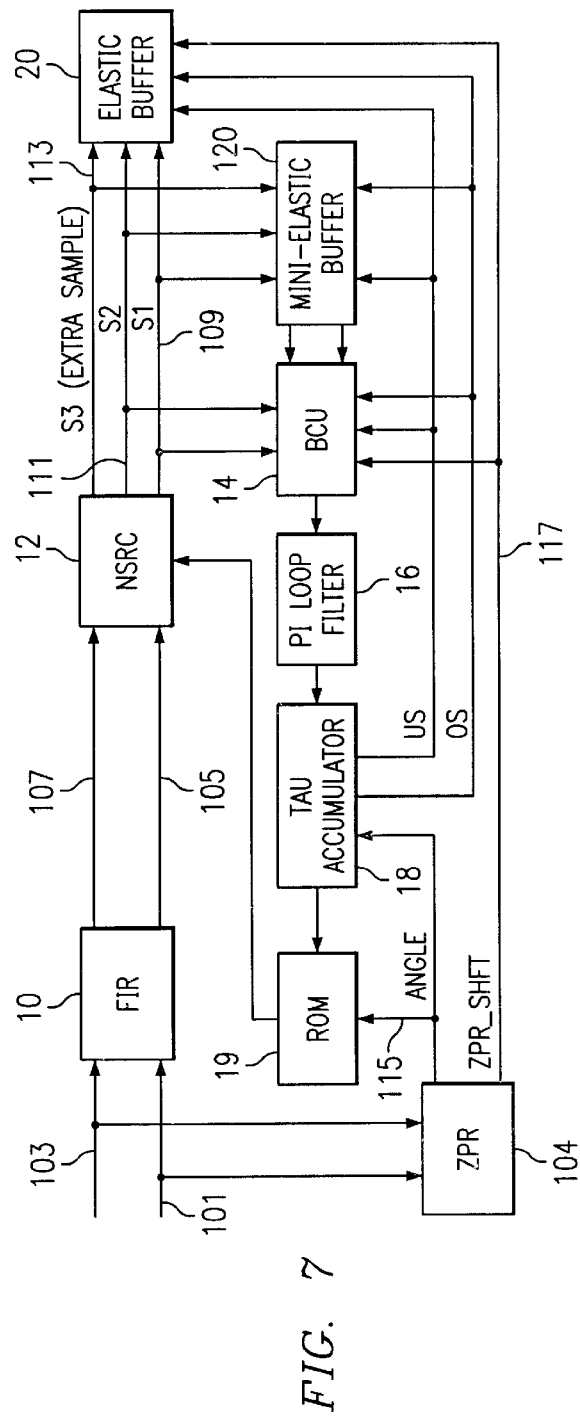
FIG. 7 is a block diagram of a magnetic storage medium read channel incorporating a second preferred embodiment of the invention.

Upon receipt of undersample signal 41, elastic buffer will be configured to accept two valid samples in a single cycle. This is accomplished by reading the first sample—interpolated value 33e as an example—on a first input line 109 (FIG. 7), incrementing write pointer 42 to point to the next memory cell, then reading the second valid sample—channel sample 31f—on a second input line 111 (FIG. 7).

As described above, by detecting instances wherein the desired interpolation interval will wrap from either its maximum or its minimum value, the preferred embodiments compensate for bogus interpolated values and for missing interpolated values that arise from the oversampling and undersampling conditions, respectively. In this way, a nominal baud rate clock can be employed and variations arising from frequency and phase differences can be readily and automatically accommodated.

A second preferred embodiment baud rate digital timing recovery circuit will now be described with reference to FIG. 7. Operation of the second preferred embodiment baud rate timing recovery circuit operates in a similar manner to the system described with reference to FIG. 1, except as described below.

Throughout the drawings, like elements in the various illustrated embodiments will be denoted with like reference numerals for clarity, although certain differences may exist in the elements as will be noted in the detailed description.

Unlike the first preferred embodiment, the system illustrated in FIG. 7 operates at half the baud rate, but provides for two parallel paths in which two incoming digital samples can be operated upon in parallel with each clock cycle. Therefore, the system has the same throughput as the first preferred embodiment, while operating at half the baud rate. Clocking the read channel at half the baud rate allows logical circuitry to be employed that would otherwise not be able to process the data at the actual baud rate. As such, the sample period in FIG. 7 is $2T_S$.

Incoming digital signals on paths 101 and 103 are input to equalization filter 10 where each sample is equalized to the nearest expected signal level before being passed on data paths 105 and 107, respectively, to sample rate converter (SRC) 12. As described above, SRC 12 operates on the incoming samples and outputs interpolated samples calculated at an interpolation interval provided by accumulator 18. SRC 12 has three output paths. Two of the output paths, 109 and 111, output the two interpolated samples, notated as S1 and S2, that were derived in parallel in SRC 12. The third output path, 113, outputs an un-interpolated sample, as may be necessary in the underampling condition as was described above. The samples are passed on paths 109, 111, and 113 to elastic buffer 20. The values are also passed to mini-elastic buffer 120 which is described in more detail below. Note that because of the parallel paths through the system every cycle, SRC 12 will output two interpolated samples each cycle during normal operation. In an oversample condition, SRC 12 will only one valid interpolated sample and one bogus interpolated sample. In the undersample condition, SRC 12 will output three samples: the interpolated sample S1, the interpolated sample S2, and the uninterpolated sample S3, which is output from SRC 12 to make up for the fact that the SRC cannot interpolate two samples in one (half-rate) cycle.

Interpolated values S1 and S2 are also passed to phase detector 14 where the phase difference between the interpolated values and the expected values is determined and a phase error signal is generated. This error signal is passed to loop filter 16 and then to accumulator 18, where the fractional delay value, also known as the interpolation interval value, τ is derived.

Recall from FIG. 4 that the interpolation interval value τ is used to select a set of coefficients employed in SRC 12 to derive the interpolation samples. Those coefficient values are stored in ROM 19 which receives as input the X value from accumulator 18 and outputs to SRC 12 the appropriate coefficient values corresponding to the desired interpolation interval.

Also shown in FIG. 7 is zero phase re-start (ZPR) block 104. This block averages the preamble samples which, as is well-known in the art, precede the information stored on the storage medium and which provide for a known signal from which to initiate the read channel parameters during the so-called acquisition phase. ZPR 104 uses the averaged information derived from the preamble to make a gain-independent estimate of the phase of the incoming signal. ZPR 104 outputs an angle signal 115 to accumulator 18. This angle signal 115 is used to select the initial value for that will be input to the SRC 12 at the start of a read cycle. The ZPR_SHFT signal 117 is output from ZPR 104 and input to elastic buffer 20. If this signal is asserted, then the starting value of write pointer 42 must be increased or decreased by 1T relative to the read pointer 40 (whichever is more convenient). This is because the sync-byte requires a specific phase of S1 and S2 samples. For instance, under some algorithms employed during acquisition mode, it is desirable for the first sample processed to be taken at the peak of the incoming signal, whereas, in other instances, it may desirable for the first processed sample to be at a zero crossing.

Also shown in FIG. 7 is mini-elastic buffer 102. The purpose of mini-elastic buffer 102 is to provide the correct stream of data to phase detector 14. Mini-elastic buffer 102 has much less latency than elastic buffer 20, but it doesn't have the depth of memory required to handle multiple wraps of T in the same direction. In other words, if τ wraps from its maximum through its minimum value several times, resulting in several bogus samples, the read pointer 40 could "catch up" with write pointer 42 (which is not incrementing because of the bogus sample), and the mini-elastic buffer might output the bogus sample. This condition only rarely occurs, however, and would likely effect only a few samples if it did occur.Preferably, mini-elastic buffer 102 can store two samples. Initially it is configured so that one sample is in its memory. Then, if there are no oversample signals or undersample conditions, two samples are read in and two samples are read out every cycle, so one sample always remains in memory. If there is an oversample event, i.e. oversample signal 39 is output from accumulator 18, the "extra" sample stored in memory is passed out to data detector 22, so as to output two samples per cycle. In an undersample event, as indicated by signal 41, an extra sample is stored and the memory buffer is full.

Figure 8:
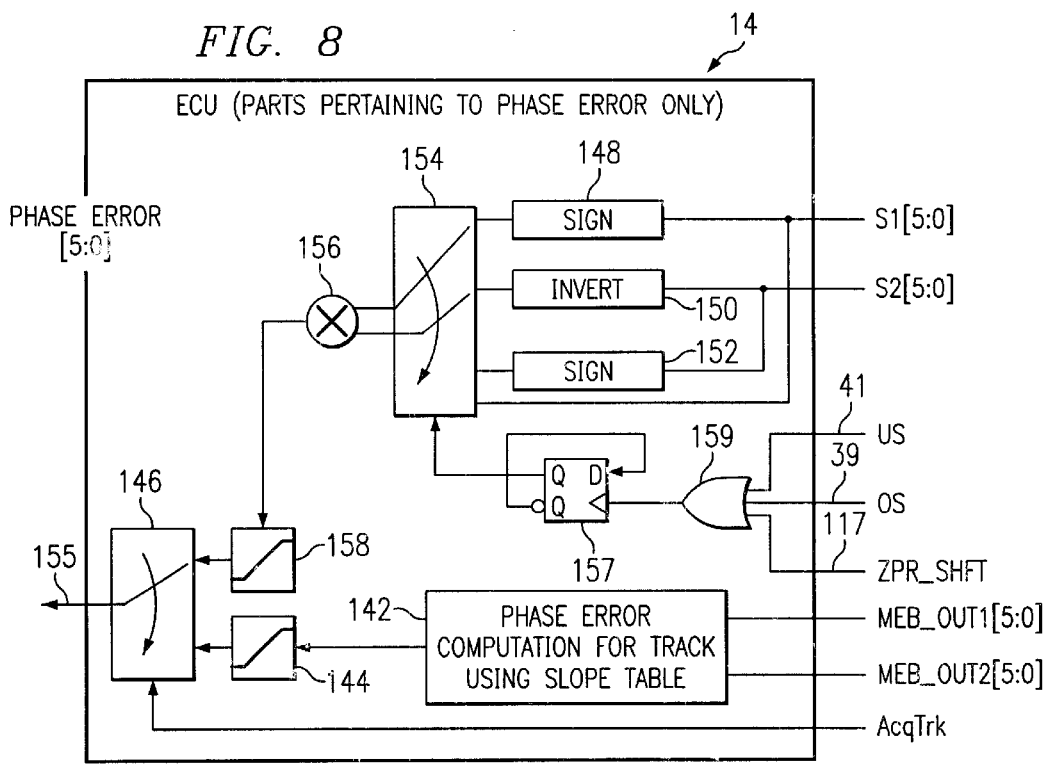
FIG. 8 is a block diagram of a preferred embodiment phase detector.

FIG. 8 provides further details of phase detector 14. Phase detector 14 has two data paths, one path for acquisition mode and one path for tracking mode. As discussed above, each block of information stored on the storage medium has a preamble section which has stored thereon a pre-defined signal. Typically this preamble signal is a sine wave of known frequency and phase. During acquisition, this preamble signal is processed by the read channel in order to initialize the read channel components to the proper gain, phase and frequency levels for reading the information which follows the preamble. The information is then read in tracking mode.

The first data path of phase detector 14, for use during tracking, consists of phase error computation block 142, saturation limiter block 144 and selector 146. Inputs signals MEB_OUT1 and MEB_OUT2, which are interpolated samples (or in the undersampling case, also may be uninterpolated samples) that were stored in and output from the mini-elastic buffer 120. These input samples are input to phase error computation block 142, which comprises a slicer circuit as well as a look up table (not shown). Incoming samples are input to the slicer circuit to generate the expected sample value. This expected sample value acts as a reference level by which to compare the incoming samples. An error signal, derived from a slope look-up table, is derived by comparing the expected sample values with the actual sample values. This error signal is then fed to saturation limiter 144, which limits the maximum value (either positive or negative) of the error signal. The signal is then passed to selector 146 which operates to output the error signal from either the track data path or the acquisition data path, depending upon the state of the AcqTrk signal.

During acquisition, samples S1 and S2 are input directly from sample rate converter 12 to phase detector 14. A phase error signal is derived according to one of the following formulae:

$$\phi_{err} = sgn(S1) \times (-S2) \quad \text{Formula 1}$$

$$\phi_{err} = sgn(S2) \times (S1) \quad \text{Formula 2}$$

The sign of sample S1 (sgn(S1)) is derived in block 148, and the sign of S2 is derived in block 152. The value of S2 is inverted in block 150. Selector block 154 selects whether the sign of S1 and the inverted value of S2 are sent to multiplier 156, resulting in Formula 1, or whether the sign of S2 and the value of S1 are sent to multiplier, resulting in Formula 2. Selector 154 selects between the Formula 1 values and the Formula 2 values depending upon the state of the output of D flip-flop 157. D flip-flop 157 is driven by OR gate 159, which OR's together the OS signal 39, the US signal 41 and the ZPR_SHFT signal 117. ZPR_SHFT signal 117 ensures that during acquisition, the read channel synchronizes to the preamble signal by ensuring that the first sample processed is at or close to the peak of the incoming preamble signal.

The acquisition path phase error signal is also value limited by saturation limiter 158 before being passed to selector 146, and then, depending upon the state of AcqTrk signal 147, being output as an the phase error signal 155.

Figure 9:
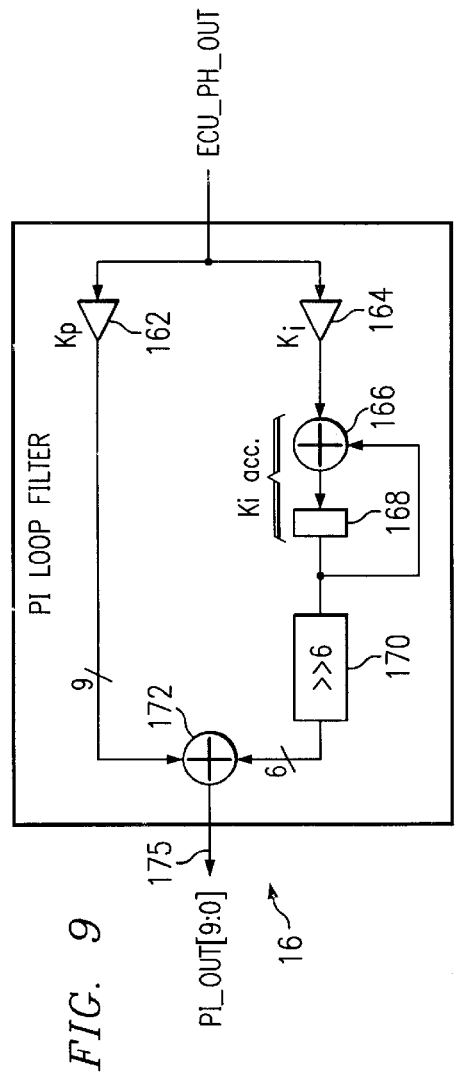
FIG. 9 is a block diagram of a preferred embodiment PI filter.

The phase error signal, preferably a four bit signal, is passed to PI filter 16. FIG. 9 provides additional details regarding a preferred embodiment PI filter. The filter has a proportional path and an integrating path. Proportional path consists of amplifier 162, which simply provides a gain to the incoming phase error signal 155 before being passed to adder 172. Preferably, amplifier 162 provides a gain value $K_P$ of 15 during acquisition mode and 8 during track mode. The rationale for the higher gain during acquisition mode is to allow the phase error loop to react quickly during acquisition to quickly generate an interpolation interval value τ. During track mode, however, it is expected that τ will change slowly and a lower gain value is employed to avoid the loop being overly sensitive to noise or minor variations in the phase error.

The integrating path of PI filter 16 comprises amplifier 164 which feeds an accumulator circuit consisting of adder 166 and register 168. After the incoming phase error signal 155 is amplified by amplifier 164, adder 166 adds its value to the value previously stored in register 168 and the result is then stored in register 168. In this way, the accumulator circuit integrates the value over time. The output from register 168 is right shifted in shifter 170, meaning only the six most significant bits from register 168 are passed on to adder 172. Shifting the value stored in register 168 to the right by six bits is equivalent to dividing the value stored in register 168 by 64 ($2^6$=64). The six bits from shifter 170 are added to the nine bit value from amplifier 162 in adder 172. The ten bit filtered phase error signal 175, designated as PI_OUT is then output from PI filter 16 and passed to accumulator 18.

Figure 10:
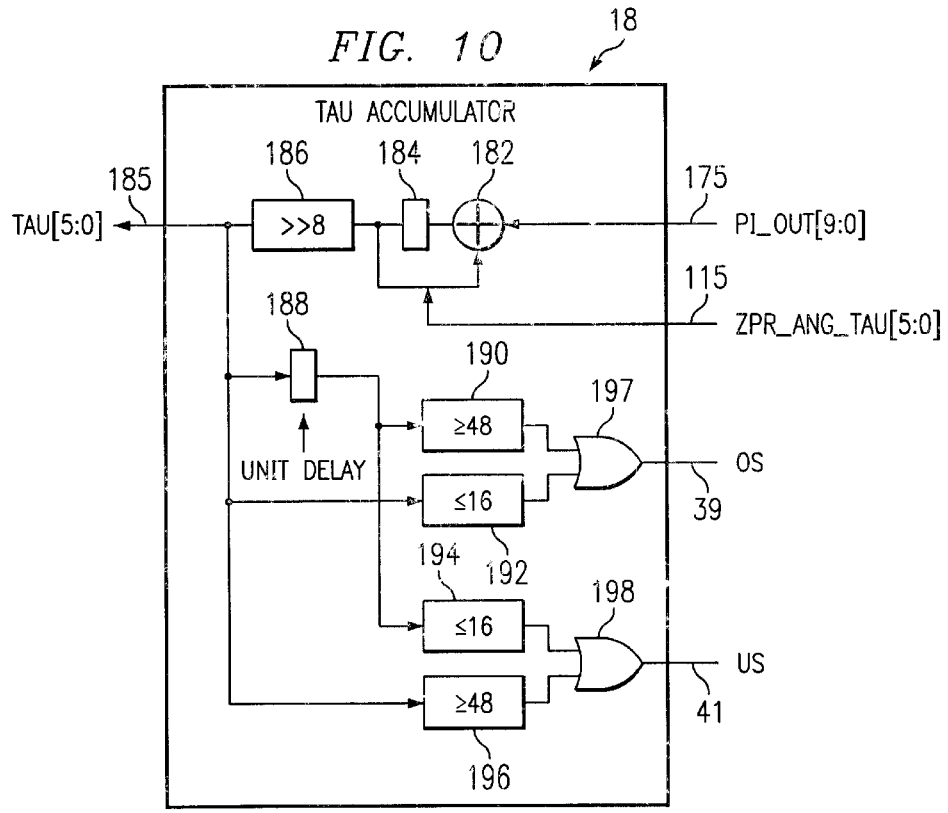
FIG. 10 is a block diagram of a preferred embodiment accumulator.

A preferred embodiment accumulator will now be discussed with reference to FIG. 10. Accumulator 18 receives as inputs the nine bit phase error signal 175 from PI filter 16 and the six bit ZPR_ANG_TAU signal 115 from ZPR block 104. Accumulator 18 outputs the six bit signal τ 185 to sample rate converter 12 by way of ROM 19, and also outputs oversample signal (OS) 39 and undersample signal (US) 41 to elastic buffer 20, phase detector 14 and mini-elastic buffer 120.

Incoming filter phase error signal 175 is fed to an accumulator circuit consisting of adder 182 and fourteen bit accumulator register 36. During acquisition an initial value for τ is calculated in zero phase restart block 104 and this initial value is input to accumulator 18 as ZPR_ANG_TAU signal 181 and stored in accumulator register 36. Incoming values for filtered phase error signal 175 are added to the previously stored value for τ from accumulator register 184, and the result is then stored in accumulator register 184. The output from accumulator register 36 is output to shifter 186, where the value is right shifted eight bits. The resulting six bit signal is output from accumulator 18 as the τ signal fed to sample rate converter 12 by way of ROM 19.

The six bit τ value is also fed to delay register 188, which is preferably a six bit wide memory register or alternatively a bank of six D flip-flops in parallel. The oversample (OS) signal 39 and undersample (US) signal 41 are generated in comparators 190 and 192, and 194 and 196, respectively, as follows.

Comparator 192 examines the value of τ at time $T_x$ and comparator 190 examines the value of τ at time $T_{x-1}$. In other words, delay register 188 stores the last value for τ for one clock cycle. Recall that oversample signal 39 is set when the value for τ wraps past its maximum value (preferably 63) through its minimum value (preferably 0). Comparator 190 compares the previous value ($T_{x-1}$) to determine if τ was at or near its maximum value, i.e. greater than 48, during the last clock cycle. If so, comparator 190 outputs a valid signal (a logical "1"). At the same time, comparator 192 compares the current value for τ ($T_X$) to determine if τ is now at or near its minimum value. If so, comparator 192 outputs a logical 1. Obviously, if both comparators 190 and 192 output a logical 1, the value for τ has wrapped through its maximum value during the immediately preceding clock cycle. The outputs from comparators 190 and 192 are ANDed together in AND gate 197 and, if both inputs are logical 1's, AND gate 197 outputs a logical 1 as oversample signal 39.

Likewise, if comparator 194 detects that τ was at or near its minimum value in the previous clock cycle and comparator 196 detects that τ is at or near its maximum value in the current clock cycle, this means τ has wrapped through its minimum value, and undersample signal 41 is output from AND gate 198, which is driven by the outputs of comparators 194 and 196.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

We claim:

1. A device for reading information stored on a medium by detecting data from a sequence of discrete time interpolated samples, the interpolated samples generated by interpolating a sequence of discrete time channel samples generated by sampling pulses in a read signal from the medium, the device comprising:

a sampling clock outputting a clock signal with a period of T;

a sampling device, responsive to the sampling clock, receiving as input the read signal and outputting the channel samples;

an interpolated timing recovery circuit receiving as input the channel samples and outputting the interpolated samples, including an accumulator for generating, modulo-T, an interpolation interval value;

an elastic buffer wherein the interpolated samples received from the interpolated timing recovery circuit are stored, and from which the interpolated samples are subsequently read out to a data detector.

2. The device of claim 1:

wherein, in response to detection that the interpolation interval value has wrapped past its maximum value to or through its minimum value, the elastic buffer prevents one interpolated sample from being read out to the data detector; and in response to detection that the fractional delay value has wrapped past its minimum value to or through its maximum value, the elastic buffer stores one interpolated sample and one associated channel sample.

3. The device of claim 1 wherein the interpolated timing recovery circuit further comprises a phase detector receiving as input the interpolated samples and outputting a phase error signal.

4. The device of claim 3 further comprising:

a PI filter receiving as input the phase error signal from the phase detector and outputting a filtered phase error signal to the accumulator.

5. The device of claim 1 wherein the sampling device is an analog to digital converter.

6. The device of claim 3 wherein the accumulator comprises a fourteen bit register and wherein the six most significant bits comprise the interpolation interval value.

7. The device of claim 1 wherein the elastic buffer comprises:

a plurality of memory cells, each memory cell capable of storing one interpolated sample;

a read pointer; and a write pointer.

8. The device of claim 7 wherein the read pointer and the write pointer are comprised of values stored in a read pointer register and a write pointer register, respectively.

9. The device of claim 1 wherein the accumulator comprises a detector circuit that outputs an oversample signal upon detecting that the interpolation interval value has wrapped past its maximum value to or through its minimum value and that outputs an undersample signal upon detecting that the interpolation interval value has wrapped past its minimum value to or through its maximum value.

10. A method for reading information from a medium at the same baud rate as the information was written to the medium, the information being stored on the medium as an analog signal, the analog signal having associated with it a phase and a baud rate, the method comprising:

reading the analog signal;

sampling the analog signal at a sample rate nominally the analog signal baud rate to generate a digital signal comprising channel samples;

interpolating between channel samples to generate an interpolated signal comprising interpolated samples, in response to an interpolation interval, the interpolation interval value having a minimum and a maximum value;

storing the interpolated samples in an elastic buffer;

passing the interpolated samples from the elastic buffer to a data detector;

detecting when the interpolation interval value has wrapped from its maximum value to or through its minimum value and in response preventing the passing of one interpolated sample from the elastic buffer to the data detector; and detecting when the interpolation interval value has wrapped from its minimum value to or through its maximum value and in response storing a channel sample in the elastic buffer in addition to an associated interpolated sample and allowing both the interpolated sample and the channel sample to pass to the data detector.

11. The method of claim 10 further including:

detecting a phase difference between the interpolated signal and an expected signal and generating a phase error signal therefrom; and accumulating values of the phase error signal and generating from the accumulated values of the phase error signal the interpolation interval value.

12. The method of claim 10 further including:

generating an oversample signal when the interpolation interval value wraps from its maximum value through its minimum value; and generating an undersample signal when the interpolation interval value wraps from its minimum value to through maximum value.

13. The method of claim 10 further including:

updating a write buffer when an interpolated sample is stored to the elastic buffer; and updating a read buffer when an interpolated or channel sample is passed to the data detector.

14. The method of claim 13 wherein the write buffer is not updated in response to the detection that the interpolation interval value has wrapped from its maximum value back through its minimum value.

15. The method of claim 10 further comprising:

comparing the interpolated samples to a reference;

generating a phase error signal in response to the comparing step;

filtering the phase error signal to generate a filtered phase error signal; and accumulating the filtered phase error signal over time to generate the interpolation interval value.

16. A read channel for correcting a phase error between a channel signal that is read from a storage medium, the channel signal having been written to the storage medium at a baud rate, comprising:

means for reading the channel signal from the storage medium;

means for sampling the channel signal to generate a sample signal comprising channel samples;

means for detecting a phase error in the sampled signal;

means for generating a modulo-T interpolation interval, where T is proportional to the baud rate;

means for interpolating between channel samples in response to the modulo-T interpolation interval to generate an interpolated signal comprising interpolated samples;

storage means for storing the interpolated samples, wherein the storage means, in response to an indication that the interpolation interval has wrapped from T to 0, treats the interpolated sample associated with such condition as invalid, and wherein the storage means, in response to an indication that the interpolation interval has wrapped from 0 to T, treats the interpolated sample associated with such condition as valid and also stores a sample point associated with such condition as valid.

17. The read channel of claim 16 wherein the modulo-T interpolation interval is one of N discrete values and wherein the means for interpolating further comprises:

memory means for storing N sets of digital filter coefficients corresponding to the N discrete interpolation intervals.

18. The read channel of claim 16 wherein said storage means comprises:

a plurality of memory cells, each such memory cell configured to hold one interpolation sample;

a write pointer means for storing the address of a next memory cell to which a next interpolation sample is to be written;

a read pointer means for storing the address of a next memory cell from which a next interpolation sample is to be read.

19. The read channel of claim 16 further comprising data detection means for receiving interpolated samples from the storage means.

20. The read channel of claim 16 further comprising:

detection means for generating an oversample signal when the interpolation interval has wrapped from T through 0; and detection means for generating an undersample signal when the interpolation interval has wrapped from 0 through T.

* * * * *